US008122252B2

(12) United States Patent
Karamchedu et al.

(10) Patent No.: US 8,122,252 B2
(45) Date of Patent: Feb. 21, 2012

(54) CASCADED DIGITAL SIGNATURES

(75) Inventors: Murali M. Karamchedu, Beaverton, OR (US); Jeffrey B. Sponaugle, Tigard, OR (US)

(73) Assignee: Kryptiq Corporation, Hillsboro, OR (US)

( * ) Notice: Subject to any disclaimer, the term of this patent is extended or adjusted under 35 U.S.C. 154(b) by 1634 days.

(21) Appl. No.: 11/365,796

(22) Filed: Feb. 28, 2006

(65) Prior Publication Data
US 2007/0204340 A1 Aug. 30, 2007

(51) Int. Cl.
*H04L 9/32* (2006.01)
(52) U.S. Cl. .................................. 713/170; 713/177
(58) Field of Classification Search .................. 713/170, 713/181, 161, 165, 177; 705/50, 51
See application file for complete search history.

(56) References Cited

U.S. PATENT DOCUMENTS

| | | | |
|---|---|---|---|
| 5,018,196 A | 5/1991 | Takaragi et al. | |
| 5,692,206 A | 11/1997 | Shirley et al. | |
| 5,912,974 A | 6/1999 | Holloway et al. | |
| 6,061,792 A | 5/2000 | Simon | |
| 6,367,013 B1 * | 4/2002 | Bisbee et al. | 713/178 |
| 6,549,624 B1 | 4/2003 | Sandru | |
| 6,609,200 B2 | 8/2003 | Anderson et al. | |
| 6,732,101 B1 | 5/2004 | Cook | |
| 6,735,575 B1 | 5/2004 | Kara | |
| 7,162,635 B2 * | 1/2007 | Bisbee et al. | 713/176 |
| 7,178,029 B2 * | 2/2007 | Ansper et al. | 713/176 |
| 7,353,396 B2 * | 4/2008 | Micali et al. | 713/176 |
| 7,548,934 B1 * | 6/2009 | Platt et al. | 1/1 |
| 7,657,751 B2 * | 2/2010 | Micali et al. | 713/176 |
| 2002/0023055 A1 * | 2/2002 | Antognini et al. | 705/40 |
| 2003/0018481 A1 * | 1/2003 | Zhou et al. | 705/1 |
| 2003/0105739 A1 * | 6/2003 | Essafi et al. | 707/1 |
| 2003/0131241 A1 * | 7/2003 | Gladney | 713/176 |
| 2003/0177361 A1 * | 9/2003 | Wheeler et al. | 713/176 |
| 2004/0019578 A1 * | 1/2004 | Kalmes et al. | 707/1 |
| 2004/0025057 A1 | 2/2004 | Cook | |
| 2004/0255116 A1 | 12/2004 | Hane et al. | |
| 2005/0114666 A1 * | 5/2005 | Sudia | 713/175 |
| 2005/0132194 A1 * | 6/2005 | Ward | 713/176 |
| 2005/0231738 A1 * | 10/2005 | Huff et al. | 358/1.1 |
| 2006/0130154 A1 * | 6/2006 | Lam et al. | 726/30 |
| 2007/0112633 A1 * | 5/2007 | Walker et al. | 705/21 |

OTHER PUBLICATIONS

Jaime Delgato et al, Broker_based secure Negotiation of intellectual property rights, Springer-Verlag Berlin Heidelberg 2001, pp. 486-496.*

* cited by examiner

*Primary Examiner* — Eleni Shiferaw
*Assistant Examiner* — Abu Sholeman
(74) *Attorney, Agent, or Firm* — Schwabe, Williamson & Wyatt, P.C.

(57) ABSTRACT

Embodiments of the present invention provide methods and systems for methods and apparatuses for generating digital signatures of digital contracts, such as digital health care contracts. More specifically, embodiments of the present invention provide methods and systems for generating and using cascading digital signatures to identify a digital contract, enabling the digital contract's integrity to be assured, and rendering the digital contract non-repudiative.

16 Claims, 8 Drawing Sheets

CASCADED DIGITAL SIGNATURES

TECHNICAL FIELD

Embodiments of the present invention relate to the field of data processing, and, in particular, to methods and apparatuses for verifying the authenticity and integrity of digital contracts, such as digital health care contracts.

BACKGROUND

With advances in integrated circuit, microprocessor, networking, and communication technologies, an increasing number of devices, in particular, digital computing devices, are being interconnected. This increased interconnectivity of computing devices has laid the groundwork for a communication infrastructure particularly well suited for digital communications between such computing devices. More specifically, the increased interconnectivity of computing devices has led to the increased use of digital documents in the formation of contracts.

In the past, digital documents, including digital contracts, were limited to digital reproductions of paper-based contracts. Over time, however, computer-based applications have grown increasingly sophisticated enabling the formation (including drafting) and analysis (including editing) of entirely digital contracts. Such digital documents often lack many of inherent security attributes of signed paper documents, such as the semi-permanence of ink embedded in paper, watermarks, the distinctiveness of individual signatures, and the general difficulty associated with erasing, interlineating, or otherwise modifying words on paper. Thus, traditional methods for verifying the authenticity and integrity of paper-based contracts are rarely applicable to digital contracts.

BRIEF DESCRIPTION OF THE DRAWINGS

Embodiments of the present invention will be readily understood by the following detailed description in conjunction with the accompanying drawings. To facilitate this description, like reference numerals designate like structural elements.

Embodiments of the invention are illustrated by way of example and not by way of limitation in the figures of the accompanying drawings.

DETAILED DESCRIPTION OF EMBODIMENTS OF THE INVENTION

Figure 1:
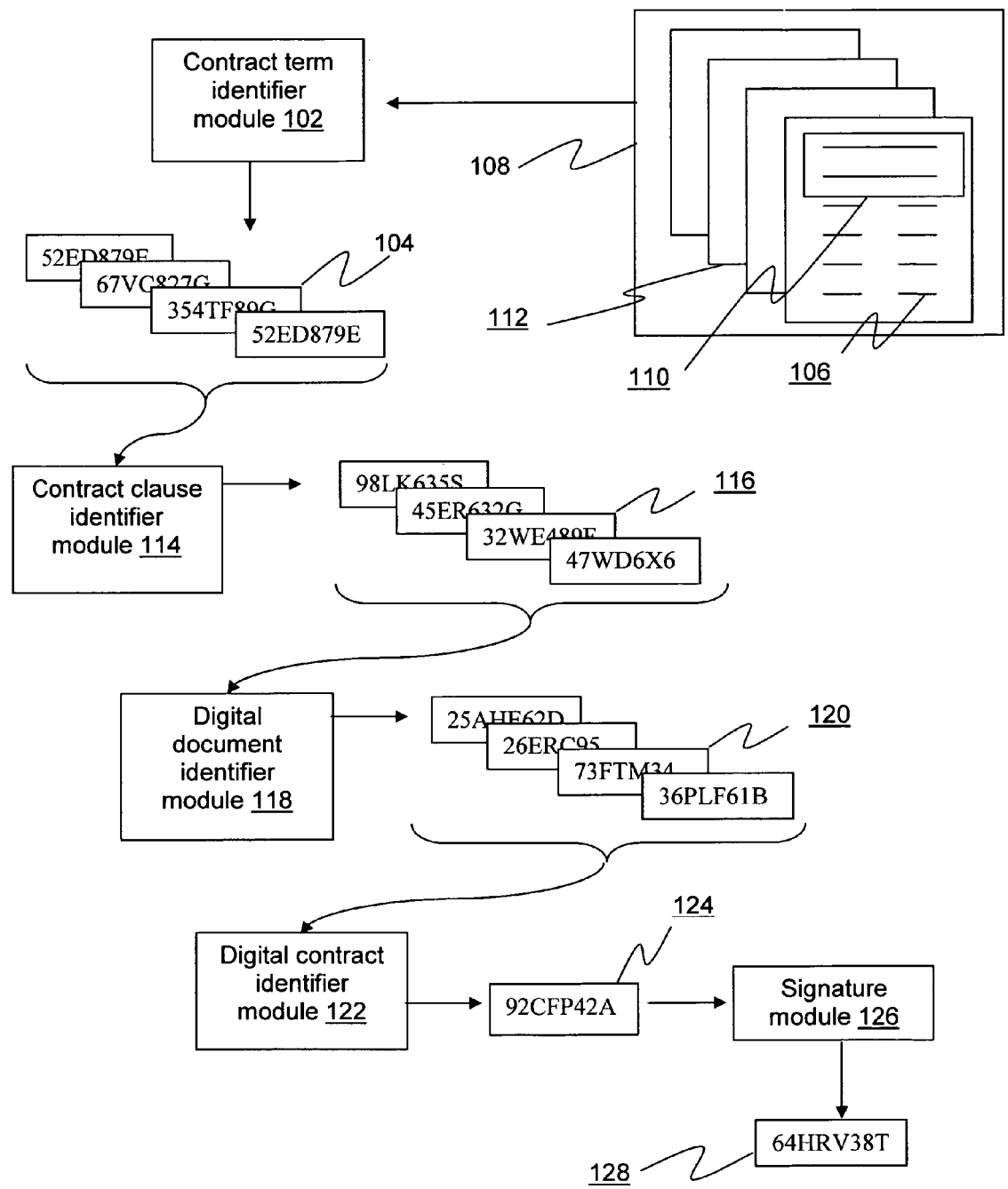
FIG. 1 illustrates selected aspects of a system for generating a digital signature in accordance with embodiments of the present invention.

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

The description is presented, in part, in terms of operations performed by a processor-based device, using terms such as selecting, forming, generating, assembling, receiving, determining, rendering, displaying, and the like, consistent with the manner employed by those skilled in the art. Quantities may take the form of electrical, magnetic, or optical signals capable of being stored, transferred, combined and/or otherwise manipulated through mechanical, electrical, and/or optical components of a processor-based device.

Various operations may be described as multiple discrete steps in turn, in a manner that may be helpful in understanding embodiments of the present invention; however, the order of description should not be construed to imply that these operations are order dependent.

For the purposes of the present invention, the phrase "A/B" means A or B. For the purposes of the present invention, the phrase "A and/or B" means "(A), (B), or (A and B)". For the purposes of the present invention, the phrase "at least one of A, B, and C" means "(A), (B), (C), (A and B), (A and C), (B and C), or (A, B and C)". For the purposes of the present invention, the phrase "(A)B" means "(B) or (AB)" that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

In various embodiments of the invention, methods and systems for verifying the authenticity and integrity of a digital contract are provided. In exemplary embodiments of the present invention, a computer system may be employed to facilitate contracting parties such as health care payers (e.g., "users") in authenticating digital health care provider contracts. In the case of a digital health care contract, the digital contract may, for example, contain all of the provisions, conditions, and terms of operation of a pension or health or welfare plan. In the following description including the claims, unless further particularized or otherwise noted, the term "digital document" is intended to refer to a broad class of digital document types including but not limited to any file produced by a computer application embodying a contract, whether or not they comprise text, binary, or otherwise encoded form.

FIG. 1 is a diagram illustrating selected aspects of a system for generating a digital signature in accordance with various embodiments of the present invention. In various embodiments, a contract term identifier module 102 may be provided to generate one or more contract term identifiers 104 using one or more digital contract terms 106. In an embodiment of the present invention, contract term identifier module 102 may be adapted to generate a contract term identifier 104 for each digital contract term 106. In various embodiments of the present invention, the term "contract term" is intended to refer to a word, phrase, or expression that relates to a particular matter. A contract term may, for example, have to do with amendments, expenses, representations, covenants, dates, restrictions, withdrawals, and the like. More specifically, in connection with a health care provider contract, a contract term may relate to payments, benefits, claims, exclusions, billings, authorizations, and the like.

In various embodiments of the present invention, digital contract terms 106 may be organized into a digital contract 108. In some of these embodiments, digital contract terms 106 may be organized into one or more contract clauses 110, which may be further organized into one or more digital documents 112. In turn, digital documents 112 may be organized into digital contract 108.

In various embodiments of the present invention, the term "identifier" refers to any symbol that establishes an identity of a digital contract or a digital contract element. A "digital contract element" may include a term, rate, value, contract clause, party or document. The term "contract clause" is generally intended to refer to any distinct article, stipulation, or provision in a digital contract.

In various embodiments of the present invention an "identifier" may comprise a hash value. The term "hash value" generally refers to a result of applying a hash function to a variable size input. A "hash function" is a transformation that takes a variable size input and returns a fixed-size string. In various embodiments of the present invention, a hash function may be a cryptographic hash function or a one-way hash function. In exemplary embodiments of the present invention, a hash function may be MD5, SHA-1, SHA-224, SHA-256, SHA-384, or SHA-512. The term "hash" or "hashing" is intended to refer to applying a hash function. In an embodiment of the present invention, contract term identifier module 102 may employ a hash function to generate contract term identifiers 104. Thus, contract term identifiers 104 may be hash values.

In various embodiments of the present invention, a contract clause identifier module 114 may be provided to generate one or more contract clause identifiers 116 for contract clauses 110. In various embodiments, contract clause identifier module 114 may generate the one or more contract clause identifiers 116 using at least the one or more digital contract term identifiers 104. In various embodiments, contract clause identifier module 114 may generate a contract clause identifier 116 for each contract clause 110. In various embodiments, the contract clause identifier module 114 may employ a hash function to generate contract clause identifiers 116. Thus, contract clause identifiers 116 may be hash values.

In various embodiments, the contract clause identifier module 114 may be adapted to aggregate contract term identifiers 104 to form one or more aggregate values. Contract clause Identifier module 114 may be further adapted to hash the aggregate values to form contract clause identifiers 116.

In various embodiments, a digital document identifier module 118 may be provided to generate one or more digital document identifiers 120 for one or more digital documents 112. In various embodiments, digital document identifier module 118 may generate digital document identifiers 120 using at least the one or more contract clause identifiers 116. In various embodiments, digital document identifier module 118 may generate a digital document identifier 116 for each contract clause identifier 116. In various embodiments, the digital document identifier module 118 may employ a hash function to generate digital document identifiers 120. Thus, for these embodiments, digital document identifiers 120 may be hash values.

In various embodiments, the digital document identifier module 118 may be provided to generate one or more digital document identifiers 120. In various embodiments, digital document identifier module 118 may be adapted to aggregate contract clause identifiers 116 to form one or more aggregate values, to generate the digital document identifiers. In various embodiments, digital document identifier module 118 may be adapted to hash such aggregate values to form digital document identifiers 120.

In various embodiments of the present invention, a digital contract identifier module 122 may be provided to generate a digital contract identifier 124 for a digital contract. In various embodiments, digital contract identifier module 122 may be adapted to generate a digital contract identifier 124 using at least the one or more digital document identifiers 120. In various embodiments of the present invention, the digital contract identifier module 122 may employ a hash function to generate digital contract identifier 124. Thus, digital contract identifier may be a hash value. In such an embodiment, the digital contract identifier module 122 may be adapted to aggregate digital document identifiers 120 to form an aggregate value. Further, digital document identifier module 118 may be adapted to hash such an aggregate value to form digital contract identifier 124.

In various embodiments, a signature module 126 may be provided to form a digital signature 128. In various embodiments, signature module 126 may be adapted to form digital signature 128 using at least the digital contract identifier 124. The term "digital signature" broadly refers to any electronic signature that may be imputed to a text via one or more of several electronic means known to those who are skilled in the art. For the embodiment, the signature module 126 may comprise a hash function to hash at least the digital contract identifier 124. Thus, digital signature 128 may be a hash value.

Figure 2:
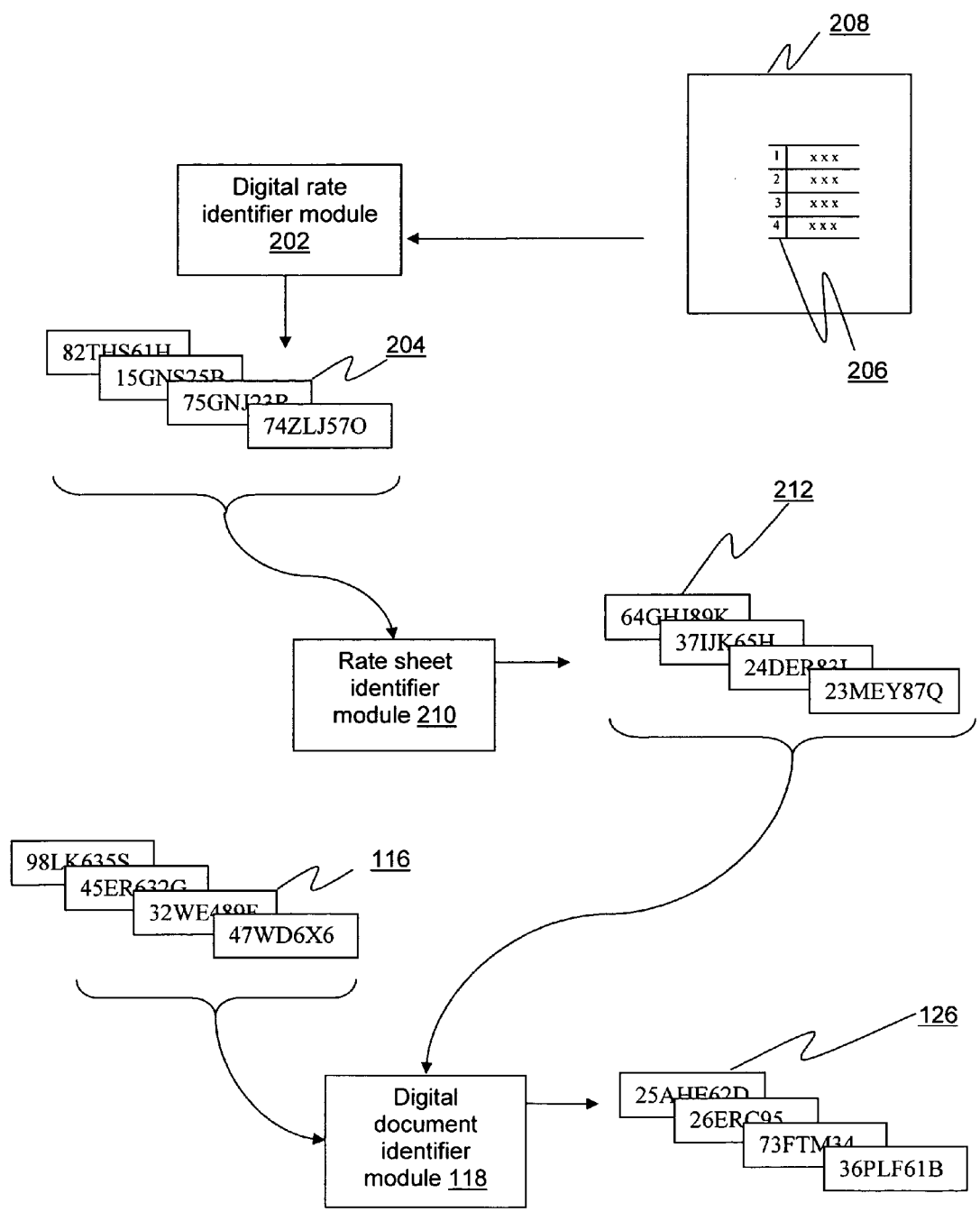
FIG. 2 illustrates selected aspects of another system for generating digital document identifiers in accordance with embodiments of the present invention.

As shown in FIG. 2, in a various embodiments of the present invention, a digital rate identifier module 202 may be provided to generate one or more digital rate identifiers 204. In various embodiments, digital rate identifier module 202 may generate digital rate identifiers 204, using one or more digital rates 206. The term "rate" is intended to broadly refer to any charge, payment, or price fixed according to a ratio, scale, or standard. More specifically, the term "rate" may refer to an insurance rate. In various embodiments of the present invention, the digital rates may be organized into one or more rate sheets 208. In various embodiments, digital rate identifier module 202 may generate a digital rate identifier 204 for each digital rate 206. In various embodiments, digital rate identifier module 202 may be adapted to employ a hash function to hash at least the one or more digital rates 206. Thus, digital rate identifiers 204 may be hash values for digital rates 206. In various embodiments, digital rate identifier 204 may be adapted to aggregate digital rate identifiers 204 to form on or more aggregate values. Further, digital rate identifier 204 may be adapted to hash such aggregate values to form digital rates 206.

In various embodiments of the present invention, a rate sheet identifier module 210 may be provided to generate one or more digital rate sheet identifiers 212 for one or more digital rate sheets. In various embodiments, rate sheet identifier module 210 may generate one or more digital rate sheet identifiers 212 using at least the one or more digital rate identifiers 204. In various embodiments, the rate sheet identifier module 210 may comprise a hash function to hash at least the one or more digital rate identifiers 204.

In various embodiments of the present invention, digital document identifier module 118 may be adapted to generate the one or more digital document identifiers 120. In various embodiments, digital document identifier module 118 may generate the one or more digital document identifiers 120 using the one or more digital rate sheet identifiers 212 and the one or more contract clause identifiers 116.

While for ease of understanding, the functions performed by contract term identifier module 102, contract clause identifier module 114, digital document identifier, digital contract identifier 124, signature module 126, digital rate identifier module 202 and digital rate sheet identifier module 210 are illustrated as seven distinct components. In practice, their functions may be partitioned and assigned to different smaller modules and/or tasks. And these tasks may be executed as a single thread or as multiple threads where appropriate.

Further, In various embodiments, the hash functions employed by contract term identifier module 102, contract clause identifier module 114, digital document identifier module 118, digital contract identifier module 122, signature module 126, digital rate identifier module 202 and digital rate sheet identifier module 210 may be the same or different, or may be the same for some, but different for the others.

Figure 3:
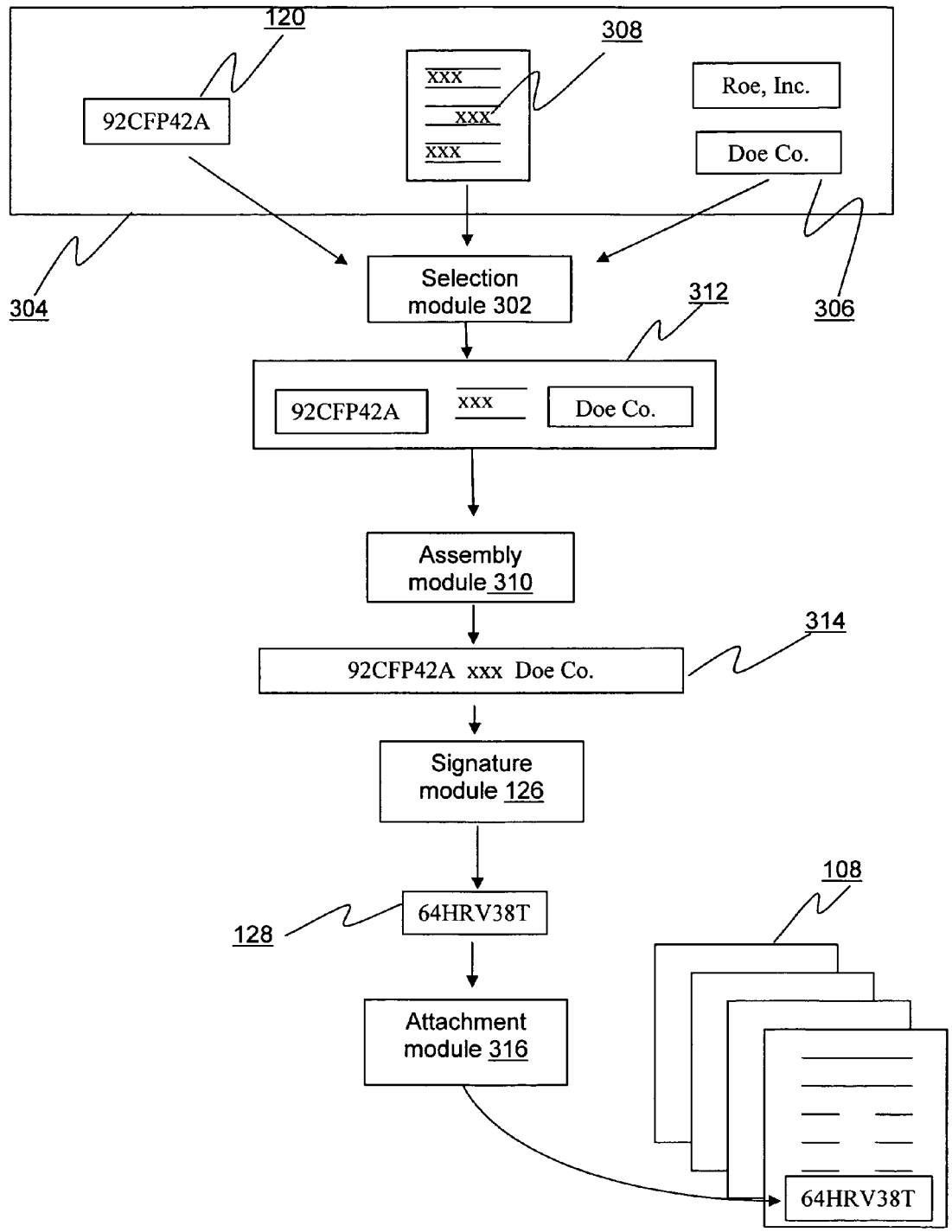
FIG. 3 illustrates selected aspects of yet another system for generating and attaching a digital signature to a digital contract in accordance with embodiments of the present invention.

FIG. 3 illustrates selected aspects of a digital signature system in accordance with various embodiments of the present invention. As shown, for the embodiments, selection module 302 may be provided to facilitate a user in selecting one or more contract elements 304 of a digital contract 108. In various embodiments of the present invention, the one or more contract elements 304 may be one or more of a digital contract identifier 124, data characteristics 308 and values 310.

In exemplary embodiments, data characteristics 308 may include a name, an address, a phone number, a tax identification number, or other related characteristics of any party to the contract. In various embodiments, digital contract 108 may comprise one or more uninterpolated variables 306 that are capable of assuming values 310. An uninterpolated variable 306 may, for example, be a contract term 106 that is left blank. Values 310 may include an amount or quantity, as of goods, services or money.

In various embodiments of the present invention, an assembly module 310 may be provided to combine the user selected contract elements 312 to form a contract value 314. For example, contract value 314 may be a linear string of the user selected contract elements 312. In a further embodiment of the present invention, signature module 126 may be adapted to generate digital signature 128 using the contract value 316. In various embodiments of the present invention an attachment module 316 may be provided to attach digital signature 128 to digital contract 108. The term "attach" broadly refers to affixing, associating or securing a digital signature to a digital contract via one or more of several electronic means known to those who are skilled in the art.

Accordingly, digital contracts may be authenticated by regenerating their signatures, and comparing the regenerated signatures with the attached signatures. Tampering is made a lot more difficult as a result of the manner the digital signatures are generated, including but not limited to the cascaded manner of generation, and the fact that the cascaded generation is based at least in part on the contract terms and/or clauses. In turn, digital contracts are made more reliable by virtue of the fact that they may be readily authenticated.

In various embodiments, the systems of FIGS. 1, 2, and 3 may be practiced together. In other embodiments, they may be practiced separately or at least partially separate.

Figure 4:
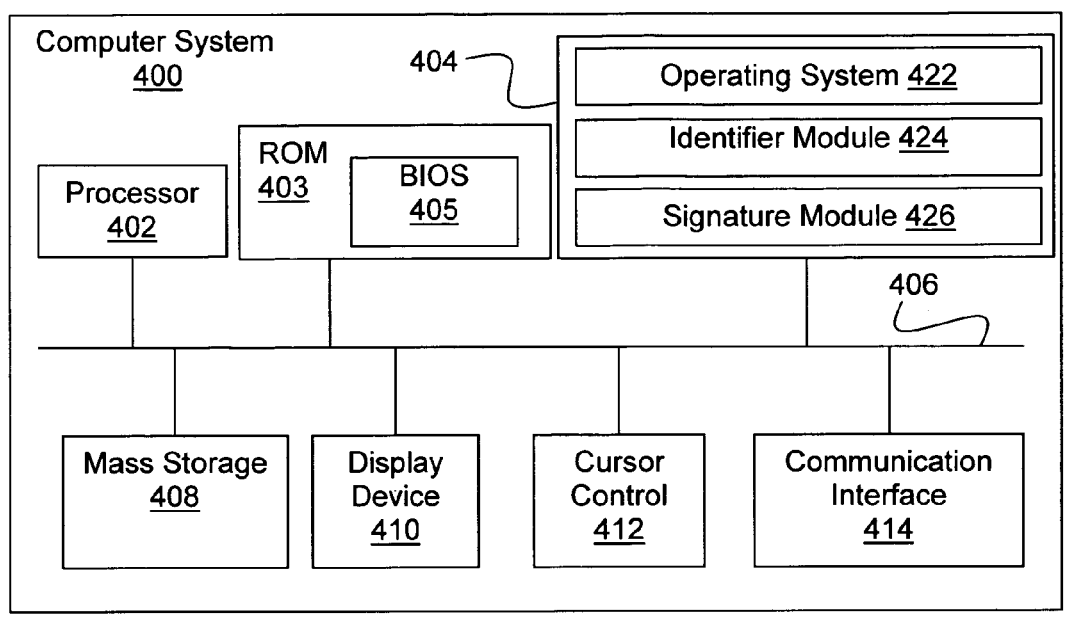
FIG. 4 illustrates an exemplary computer system for generating a digital signature in accordance with an embodiment of the present invention.

FIG. 4 includes processor 402, ROM 403 including basic input/output system (BIOS) 405, and system memory 404 coupled to each other via "bus" 406. Also coupled to "bus" 406 are nonvolatile mass storage 408, display device 410, cursor control device 412, and communication interface 414. During operation, system memory 404 may also include working copies of operating system 422, identifier module 424 and signature module 426. In various embodiments, system memory-404 may also include one or more applications (not shown), with which identifier module 424 and signature module 426 are coupled. In various embodiments of the present invention, identifier module 424 may include contract element identifier logic in accordance with embodiments of the present invention to generate cascading identifiers for a digital contract as described earlier. In other words, identifier module 424 may include one or more of contract term identifier module 102, contract clause identifier module 114, digital document identifier module 118, digital contract identifier module 122, digital rate identifier module 202 and digital rate sheet identifier module 210. In various embodiments of the present invention, signature module 426 may include digital signature logic in accordance with embodiments of the present invention to generate a digital signature for a digital contract. For example, signature module 426 may include signature module 124 earlier described.

Figure 5:
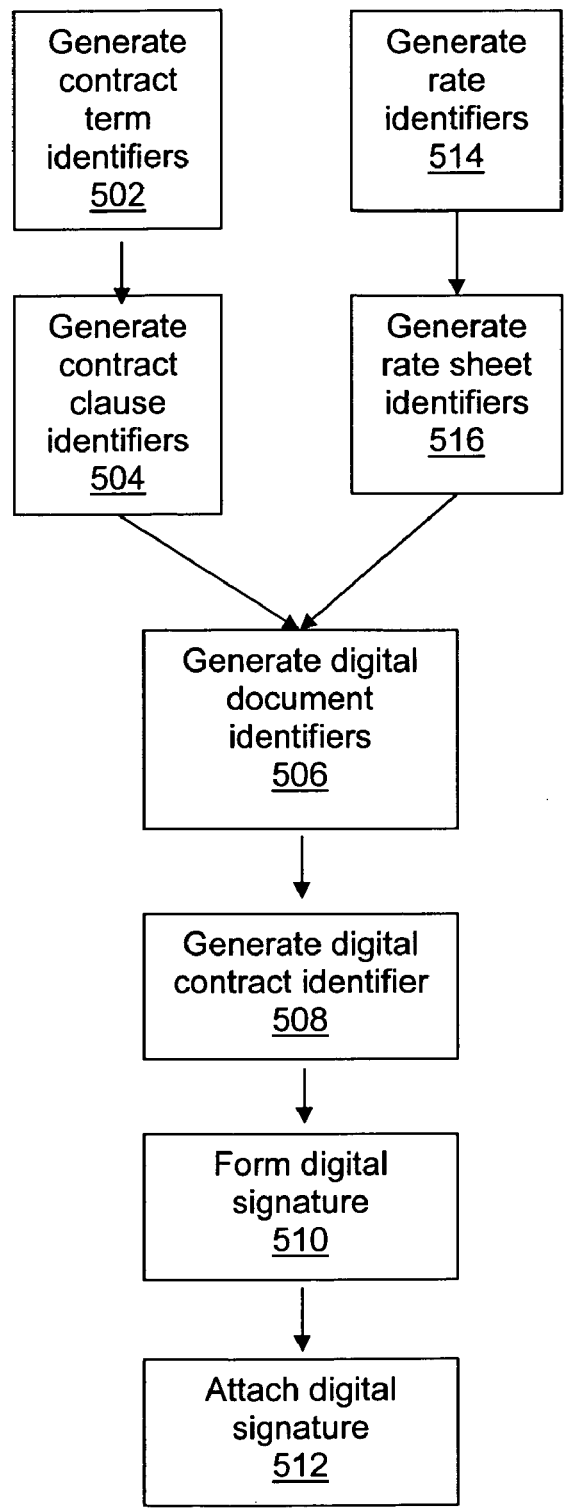
FIG. 5 illustrates a flowchart of a method for forming a digital signature in accordance with an embodiment of the present invention.

FIG. 5 illustrates a flowchart of a method for creating and attaching a digital signature to a digital contract in accordance with various embodiments of the present invention. In block 502, one or more digital contract term identifiers are generated from one or more digital contract terms. In various embodiments of the present invention, the digital contract term identifiers may be used to create one or more digital contract clause identifiers (block 504). Once generated, the digital contract clause identifiers may be used to generate one or more digital document identifiers (block 506). In an embodiment of the present invention, digital contract term identifiers may be used to directly to generate one or more digital document identifiers. In various embodiments of the present invention, the digital document identifiers may be used to generate a digital contract identifier (block 508). In various embodiments of the present invention, the digital contract identifier may then be used to generate a digital signature (block 510). In various embodiments, the digital signature may be attached to the digital contract (block 512).

In various embodiments of the present invention, one or more digital contract rates may be used to create one or more digital rate identifiers (block 514). Once created, the digital rate identifiers may be used to form one or more rate sheet identifiers (block 516). For the embodiments, the digital contract clause identifiers and the digital rate sheet identifiers may be used to create the one or more digital document identifiers (block 506).

Figure 6:
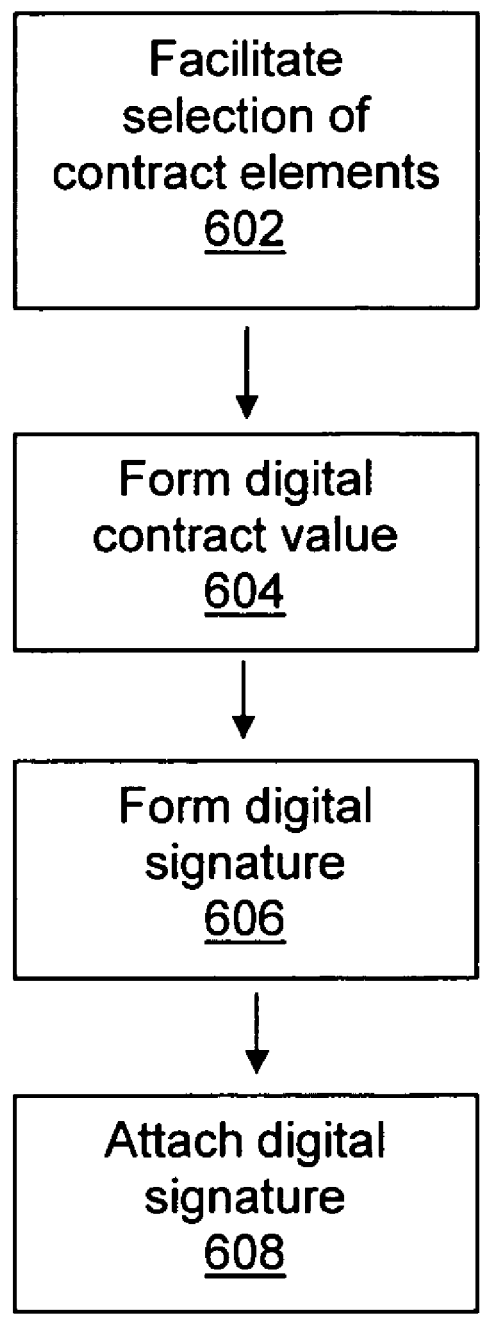
FIG. 6 illustrates a flowchart of a method for selecting contract elements of a digital contract and forming a digital signature for the digital contract in accordance with an embodiment of the present invention.

FIG. 6 illustrates a flowchart of a method for creating and attaching a digital signature to a digital contract in accordance with various embodiments of the present invention. In block 602, a user is facilitated in selecting digital contract elements. In various embodiments of the present invention, the digital contract elements may be used to form a digital contract value (block 604). Once formed, the digital contract value may be used to form a digital signature (block 606). In various embodiments, the digital signature may be attached to a digital contract (block 608).

Figure 7:
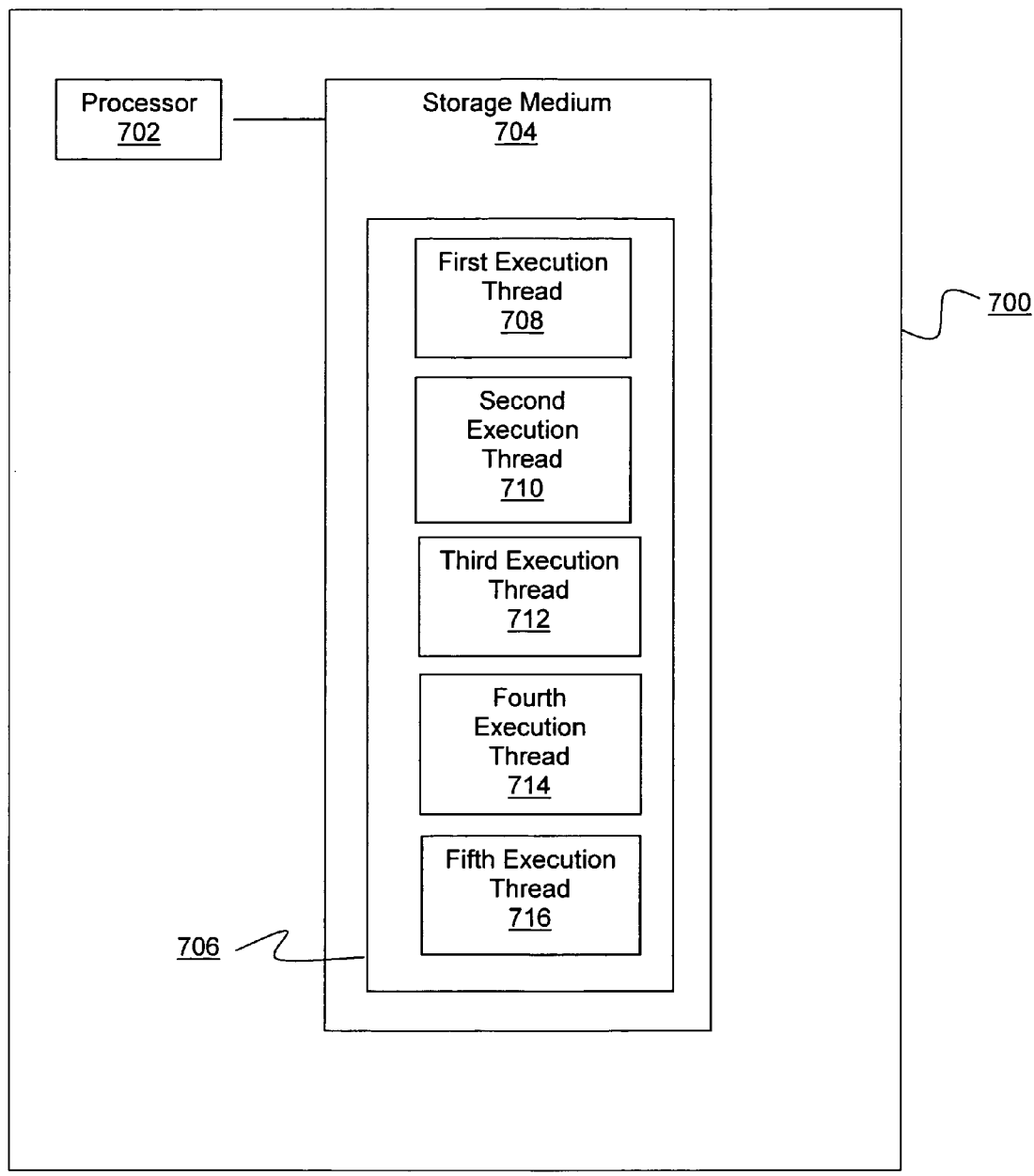
FIG. 7 illustrates an exemplary apparatus capable of generating a digital signature in accordance with an embodiment of the present invention.

FIG. 7 is a diagram of another exemplary computer apparatus in accordance with embodiments of the present invention. As shown, computer apparatus 700 includes processor 702 coupled to storage medium 704. In various embodiments, storage medium 704 may store a plurality of programming instructions 706 for generating identifiers for a digital contract in accordance with embodiments of the present invention. Plurality of programming instructions 706 may, for example, include a first execution thread 708 executing an earlier described contract term identifier module/task equipped to generate one or more contract term identifiers for one or more digital contract terms; a second execution thread 710 executing an earlier described contract clause identifier module/task equipped to generate one or more contract clause identifiers for one or more digital contract clauses using the one or more contract term identifiers; a third execution thread 712 executing an earlier described digital document identifier module/task equipped to generate one or more digital document identifiers for one or more digital documents using at least the one or more contract clause identifiers and/or the one or more contract term identifiers directly; a fourth execution 714 thread executing an earlier described digital contract identifier module/task equipped to generate a digital contract identifier for a digital contract using the one or more digital document identifiers; a fifth execution thread 716 executing an earlier described signature module/task equipped to form a digital signature for the digital contract using at least the digital contract identifier. During operation, processor 702 may execute plurality of programming instructions 706 in multiple threads.

Figure 8:
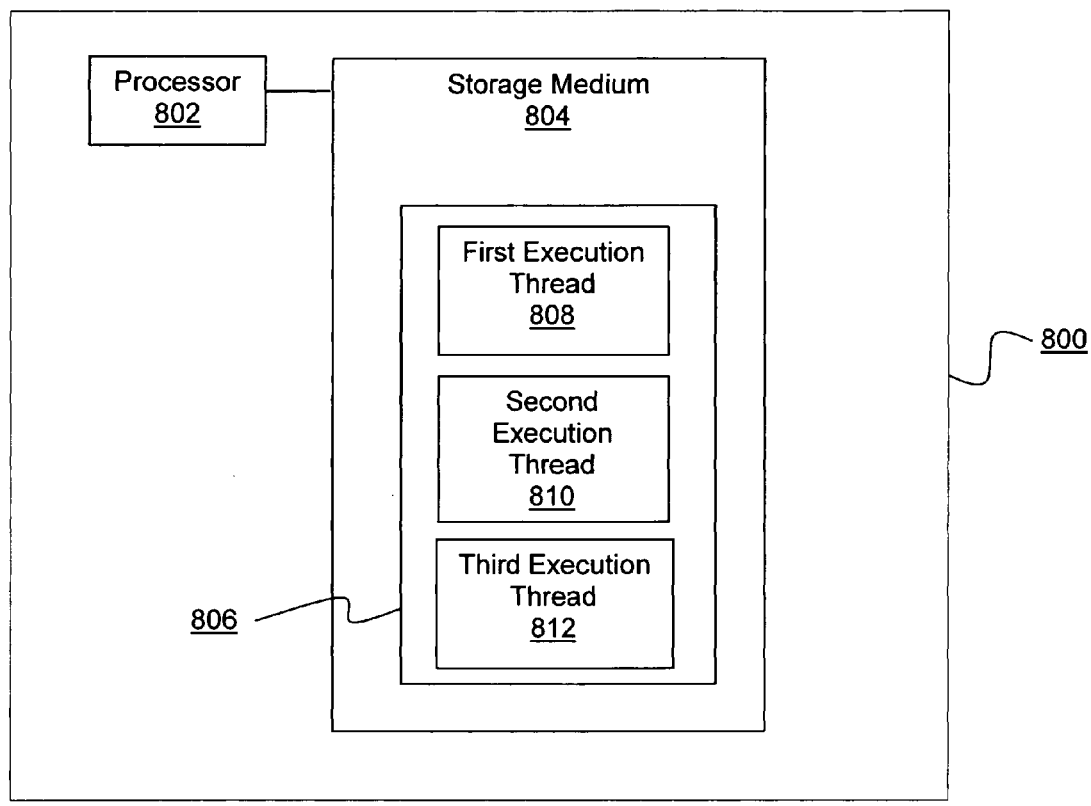
FIG. 8 illustrates an exemplary apparatus capable of facilitating selection of contract elements of a digital contract and generating a digital signature for the digital contract in accordance with an embodiment of the present invention.

FIG. 8 is a diagram of an exemplary computer apparatus in accordance with embodiments of the present invention. As shown, computer apparatus 800 includes processor 802 coupled to storage medium 804. In various embodiments, storage medium 804 may store a plurality of programming instructions 806 for generating and attaching a digital signature to a digital contract in accordance with embodiments of the present invention. Plurality of programming 806 instructions may, for example, include a first execution thread 808 executing an earlier described contract identifier module/task equipped to facilitate a user in selecting one or more of a digital contract identifier for the digital contract, data characteristics of one or more parties to the digital contract and one or more values interpolated into the digital contract; a second execution 810 thread executing an earlier described contract term module/task equipped to combine the user selected contract elements to form a contract value; and a third execution thread 812 executing an earlier described signature module/task equipped to generate a digital signature using the contract value. During operation, processor 802 may execute plurality of programming instructions 706 in multiple threads.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A method, comprising:
   generating a digital contract term identifier of a digital contract term using at least the digital contract term;
   generating a digital contract clause identifier of a digital contract clause using at least the digital contract term identifier;
   generating a digital document identifier for a digital document using, as input for a transformation, at least one of the digital contract clause identifier of the digital contract clause and the digital contract term identifier of the digital contract term;
   generating a digital contract identifier for a digital contract using, as input for a transformation, at least the digital document identifier; and
   forming a digital signature using at least the digital contract identifier;
   wherein:
   generating the digital contract term identifier comprises hashing at least the digital contract term to generate a contract term hash value for the digital contract term;
   generating the digital contract clause identifier comprises hashing at least the contract term hash value to generate a contract clause hash value for the digital contract clause;
   generating the digital document identifier comprises hashing at least the contract clause hash value to generate a document hash value for the digital document; and
   generating a digital contract identifier comprises hashing at least the document hash value to generate a contract hash value for the digital contract.

2. The method of claim 1, wherein generating the digital contract term identifier for digital contract term comprises generating a digital contract term identifier for each of a plurality of digital contract terms;
   generating the contract clause identifier for the digital contract clause comprises generating the digital contract clause identifier for each of a plurality of digital contract clauses; and
   generating the digital document identifier for the digital document comprises generating the digital document identifiers for each of a plurality of digital documents.

3. The method of claim 1, wherein said hashing at least the contract term hash value comprises:
   combining a plurality of contract term hash values corresponding to a plurality of digital contract terms to form an aggregate hash value for the digital contract clause, wherein the digital contract clause comprises the plurality of digital contract terms; and
   hashing at least the aggregate hash value.

4. The method of claim 1, wherein said hashing at least the contract clause hash value comprises:
   combining a plurality of contract clause hash values corresponding to a plurality of digital contract clauses to form an aggregate hash value for the digital document, wherein the digital document comprises the plurality of digital contract clauses; and
   hashing at least the aggregate hash value.

5. The method of claim 1, wherein said hashing at least the document hash value comprises:
   combining a plurality of document hash values corresponding to a plurality of digital documents to form an aggregate hash value for the digital contract, wherein the digital contract comprises the plurality of digital documents; and hashing at least the aggregate hash value.

6. The method of claim 1, further comprising:
generating one or more digital rate identifiers for one or more digital rates; and
generating one or more digital rate sheet identifiers for one or more digital rate sheets using the one or more digital rate identifiers.

7. The method of claim 6, wherein
said generating one or more digital rate identifiers comprises hashing one or more digital rates to generate one or more rate hash values for the one or more digital rates; and
said generating one or more digital rate sheet identifiers comprises hashing the one or more rate hash values to generate one or more rate sheet hash values for the one or more digital rate sheets.

8. The method of claim 6, wherein said generating the digital document identifier for the digital document further comprises generating the digital document identifier using the one or more digital rate sheet identifiers.

9. The method of claim 1, wherein said forming a digital signature using at least the digital contract identifier further comprises forming the digital signature using one or more of the following elements of the digital contract:
characteristic data for one or more parties to the digital contract; and
one or more values interpolated into the digital contract.

10. The method of claim 1, further comprising attaching the digital signature to the digital contract.

11. The method of claim 1, wherein the digital contract comprises a health plan provider contract.

12. A system, comprising:
a processor;
an identifier module operated by the processor to generate a digital contract clause identifier for a digital contract clause using a digital contract term identifier, to generate a digital document identifier for a digital document using, as input for a transformation, the digital contract clause identifier or the digital contract term identifier, and to generate a digital contract identifier for a digital contract using, as input for a transformation, at least the digital document identifier; and
a signature module operated by the processor to form a digital signature for the digital contract using at least the digital contract identifier;
wherein the identifier module further comprises a hash function adapted to hash one or more contract clause hash values to generate one or more document hash values for the digital document, further comprises a hash function adapted to hash one or more of the document hash values to generate a contract hash value for the digital contract, further comprises a hash function adapted to hash at least one or more contract term hash values to generate the one or more contract clause hash values; and further comprises a hash function adapted to hash one or more digital contract terms to generate the one or more contract term hash values.

13. The system of claim 12, wherein the identifier module is further operated by the processor to generate one or more digital rate identifiers for one or more digital rates; and to generate one or more digital rate sheet identifiers for one or more digital rate sheets using the one or more digital rate identifiers.

14. The system of claim 13, wherein the identifier module further comprises a hash function adapted to hash the one or more digital rates to generate one or more rate hash values for the one or more digital rates, and further comprises a hash function adapted to hash the one or more rate hash values to generate one or more rate sheet hash values.

15. The system of claim 13, wherein the identifier module is adapted to generate the one or more digital document identifiers for each of the one or more digital documents using at least the one or more digital rate sheet identifiers.

16. An apparatus, comprising:
a storage medium having stored therein a plurality of programming instructions designed to implement a first execution thread equipped to generate a contract term identifier for a digital contract term by hashing the digital contract term to generate a contract term hash value for the digital contract term; a second execution thread equipped to generate a contract clause identifier for a digital contract clause by hashing the contract term hash value to generate a contract clause hash value for the digital contract clause; a third execution thread equipped to generate a digital document identifier for a digital document by hashing the contract clause hash value to generate a document hash value for the digital document; a fourth execution thread equipped to generate a digital contract identifier for a digital contract by hashing the document hash value to generate a contract hash value for the digital contract; a fifth execution thread equipped to form a digital signature for the digital contract using at least the contract hash value; and
a processor coupled to the storage medium to execute the programming instructions.

\* \* \* \* \*